Jan. 1, 1974 H. N. KELLER ET AL 3,783,056

TECHNIQUE FOR THE FABRICATION OF AN AIR ISOLATED CROSSOVER

Filed June 20, 1972

United States Patent Office 3,783,056
Patented Jan. 1, 1974

3,783,056
TECHNIQUE FOR THE FABRICATION OF AN AIR ISOLATED CROSSOVER

Harry Nevin Keller, Center Valley, and Arnold Pfahnl, Allentown, Pa., assignors to Bell Telephone Laboratories, Incorporated, Murray Hill, N.J.

Filed June 20, 1972, Ser. No. 264,618
Int. Cl. C23f *1/02*
U.S. Cl. 156—3 3 Claims

ABSTRACT OF THE DISCLOSURE

A technique is described for the fabrication of an air isolated crossover including a supplementary insulating layer which is compatible with the crossover process and the thin film conductor system utilized in its fabrication. The supplementary insulating layer comprises silicon dioxide and is deposited during the processing sequence by conventional evaporation or other deposition techniques. The resultant double dielectric permits free movement of beams during temperature cycling, avoids edge deposition problems due to shadowing on sharp edges of the dielectric and makes pinholes in the dielectric innocuous.

This invention relates to a technique for the fabrication of an air isolated crossover. More particularly, the present invention relates to a technique for the fabrication of an air isolated crossover between two conductors separated by an intermediate conductor.

DESCRIPTION OF THE PRIOR ART

During the past decade, electronic systems have increased in size and complexity, so creating the need for greater numbers of components and the required interconnections. Extensive research effort has been directed toward the fabrication of circuits which not only are reliable and stable in use but also retain those characteristics over prolonged periods of time and are capable of being manufactured economically. The beam lead technology has evolved in response to this need.

Utilization of thin film technology inherently permits a substantial reduction in individual lead connections with an accompanying increase in reliability. This reduction in individual lead connections is possible because a plurality of circuit components can frequently be formed on a single substrate from a single continuous film or from adjacent film layers, inherently interconnecting the components. In those instances where conductors must cross each other without electrical contacts, crossovers are required. In recent years, the beam or air insulated type of crossover has gained widespread acceptance in the electronics industry. Such crossovers typically rely upon the use of a titanium-copper spacing layer which is deposited by vacuum evaporation and electroplating techniques upon a substrate member having a conductor pattern delineated therein, the latter also having been deposited by vacuum evaporation procedures. The original preparative processes for crossovers on silicon integrated circuitry utilized a second or supplementary insulating layer under the beams, this layer being made by the thermal oxidation of zirconium. However, with the further sophistication of the technology, particularly thin film technology, this step was omitted because the conventional temperatures utilized in the oxidation step, typically of the order of 450° C., were found to be incompatible with titanium-palladium-gold conductor stability. Nonetheless, the yields achieved were high enough so that circuits including up to 400 crossovers could be economically manufactured.

As the electronics industry progressed even further, advanced systems were developed requiring from 800 to 4000 crossovers per circuit and it was discovered that the high yields required for economical processing and packaging could not be achieved in the absence of a supplementary insulating layer that will prevent shorts due to metallic debris generated during repairs and/or accidental deformation of crossovers during the packaging sequence.

In accordance with the present invention, a technique for obviating the limitations of the prior art is described wherein a supplementary insulating layer which is compatible with the crossover process and the thin film conductor system is utilized. Briefly, the inventive technique involves depositing a layer of silicon dioxide upon the substrate after delineation of the bottom conductor pattern. The deposited silicon dioxide is then etched from all areas to be later contacted by electrical test probes, lead frames or silicon integrated circuit beams and the crossover circuit completed following the standard crossover processing sequence. The double dielectric, silicon dioxide and air, permits free movement of the beams during temperature cycling, avoids edge deposition problems due to shadowing on sharp edges of the dielectric and makes pinholes in the dielectric innocuous.

The invention will be more readily understood by reference to the following detailed description taken in conjunction with the accompanying drawing wherein FIG. 1 is a front elevational view in cross section of a substrate member suitable for use in the practice of the present invention;

Figure 1:
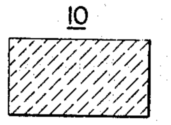

With reference now more particularly to FIG. 1, there is shown a front elevational view in cross section of a typical substrate member 10 suitable for use in the practice of the present invention. The substrate chosen for use herein is insulating in nature and may be selected from among any conventional material utilized in electronic circuitry such as ceramics, glass, semiconductor materials and the like.

Figure 2:
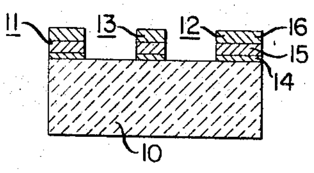
FIG. 2 is a front elevational view in cross section of the substrate of FIG. 1 after the selective deposition thereon of titanium-palladium-gold conductors.
Figure 3:
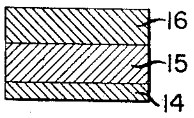
FIG. 3 is a front elevational view in cross section of a metal contact of the type shown in FIG. 2.
Figure 4:
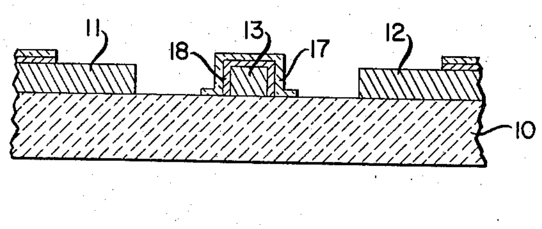
FIG. 4 is a front elevational view in cross section of the structure of FIG. 2 after the deposition thereon of an adhesion promoter and a layer of silicon dioxide.
Figure 5:
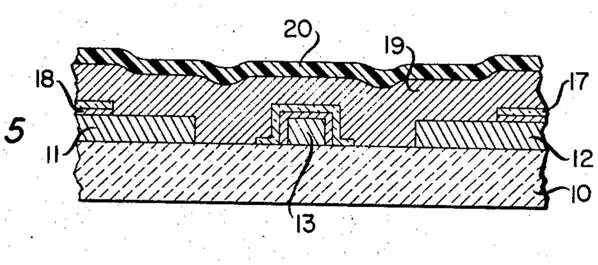
FIG. 5 is a front elevational view in cross section of the structure of FIG. 4 after the deposition thereon of a spacing layer and a photoresist.

In accordance with conventional beam lead techniques, the pair of conductors which it is desired to connect by means of a crossover and the intermediate conductor are composite structures comprising at least three different metal films deposited upon each other. Initially, there are deposited upon substrate 10 metal contacts 11 and 12 (FIG. 2) between which an electrical connection is desired crossing over an intermediate lower conductor 13. Contacts 11 and 12 and conductor 13 are comprised of an adhesion promotor 14 (FIG. 3), typically titanium, a noble metal 15 selected from among platinum, palladium and rhodium which serves as the intermediate layer of the conductive composite and prevents metal migration, and a layer of gold 16. Although the relative thickness of the deposited films are not critical, ranges dictated by practical considerations may be set forth as follows: adhesion promoter, 100 to 500 A.; noble metal, 1000 to 4000 A., and gold, 1000 to 15,000 A.

Following the selective deposition of the conductor pattern, a layer of silicon dioxide 17 is deposited upon the substrate member by any convenient procedure, as for example, evaporation or sputtering, chemical vapor deposition, etc., in a thickness ranging from 2000 to 15,000 A. dependent upon the particular device applications for which the structure is designed. It may also be desirable to deposit an adhesion promoter 18 upon the substrate surface prior to the deposition of silicon dioxide. In order to assure coverage of the edges of the conductors doping of the silicon dioxide with boron or phosphorous is required. The silicon dioxide is then etched from all areas which will later be contacted by electrical test probes, lead frames or silicon integrated circuit beams.

Following, the crossover circuit is completed by conventional crossover processing procedures. Initially, there is deposited upon the assembly a spacing layer 19 which is comprised of from 100 to 1000 A. of titanium and 10,000 to 350,000 A. of copper. The thickness of layer 19 is sufficient to satisfy the requirements relative to the magnitude of the desired gap between the crossover and the intermediate conductor. Typically, layer 19 is plated or deposited to a thickness of circa 1 mil (250,000 A.).

Figure 6:
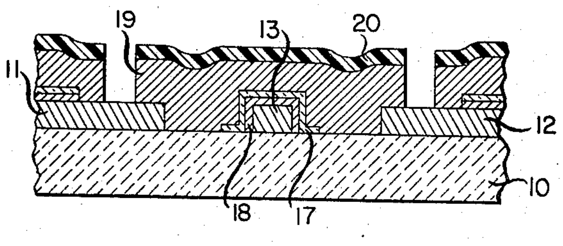
FIG. 6 is a front elevational view in cross section of the structure of FIG. 5 after selective etching thereof.

The next step in the fabrication of a crossover in accordance with the present invention involves depositing a photoresist 20 upon copper spacing layer 19. Prior to the deposition of the photoresist 20, it may be advantageous to deposit an adhesion promoter thereon for the purpose of enhancing the adhesion of the photoresist to spacing layer 19. Then, pillar holes are delineated in the assembly by conventional photoengraving techniques. This involves exposing the photoresist, developing and etching the pillar holes above the first and third conductor regions, that is, above contacts 11 and 12. The photoresists selected for use in the practice of the invention may be selected from among any of the commercially available materials. In the photoengraving process the photoresist 20 and copper layer 19 above the metal contacts 11 and 12, are removed thereby exposing gold layer 16 (FIG. 6). Then the photoresist overlying spacing layer 19 in the area between contacts 11 and 12 is removed, thereby exposing layer 19.

Figure 7:
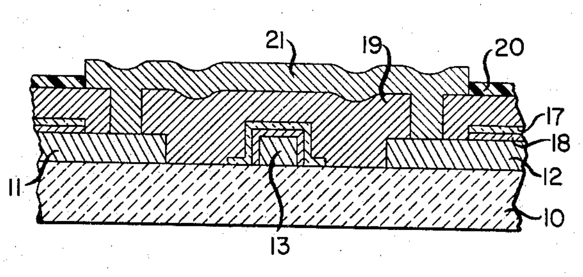
FIG. 7 is a front elevational view in cross section of the structure of FIG. 5 after the deposition thereon of a crossover.

At this juncture, gold deposition is effected in the pillar holes upon gold layer 16 and upon spacing layer 19 in the region bridging the two pillar holes. Shown in FIG. 7 is gold bridging layer 21 deposited upon gold layer 16 and spacing layer 19.

Figure 8:
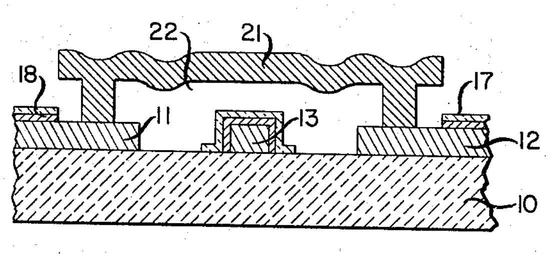
FIG. 8 is a front elevational view in cross section of the structure of FIG. 7 after etching away unwanted material to yield an air isolated crossover.

Finally, the isolation of gold bridging layer 21 (the crossover) is effected by removing copper spacing layer 19 in the region between contacts 11 and 12, so defining air gap 22 (FIG. 8). The only remaining step in the fabrication of the desired structure involves the removal of excess silicon dioxide, adhesion promoter and extraneous debris at the edges and internal areas of the substrate. This end may be effected by any well known etching technique utilizing conventional etchants such as ammonium persulfate for the copper, ferric chloride for noble metal, etc.

What is claimed is:

1. Technique for the fabrication of an air-isolated crossover between a pair of conductors separated by an intermediate conductor comprising the steps of delineating a conductor pattern upon a substrate member, depositing a copper spacing layer upon the resultant assembly, etching pillar holes therein, depositing a crossover therein and selectively removing unwanted material, so resulting in the formation of a structure having an insulating air gap between a conductive crossover connecting said pair of conductors, characterized in that a layer of $SiO_2$ is deposited upon said intermediate conductor and exposed regions of said substrate prior to deposition of the copper spacing layer.

2. Technique in accordance with claim 1 wherein an adhesion promoter is deposited upon said intermediate conductor and exposed regions of said substrate prior to deposition of the $SiO_2$ layer.

3. Technique in accordance with claim 1 wherein said $SiO_2$ layer ranges in thickness from 2000 to 15,000 A.

References Cited

UNITED STATES PATENTS

| | | | |
|---|---|---|---|
| 3,647,585 | 3/1972 | Fritzinger et al. | 156—17 |
| 3,672,985 | 6/1972 | Nathanson et al. | 156—17 X |
| 3,681,134 | 8/1972 | Nathanson et al. | 156—17 X |
| 3,461,524 | 8/1969 | Lepselter | 156—3 U X |

WILLIAM A. POWELL, Primary Examiner

U.S. Cl. X.R.

156—8, 17